C. W. HALL.
TRUSS.
APPLICATION FILED MAY 24, 1919.
1,431,521.   Patented Oct. 10, 1922.
5 SHEETS—SHEET 1.
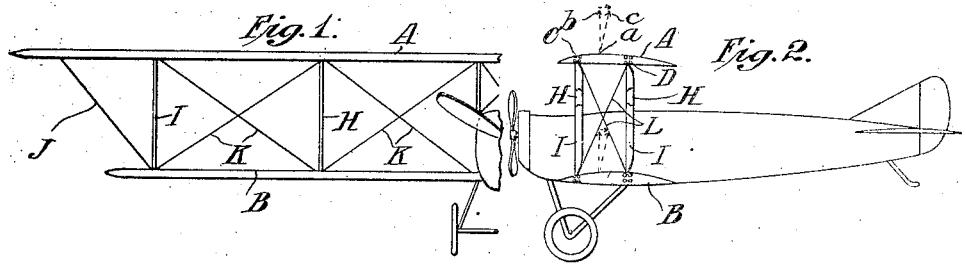
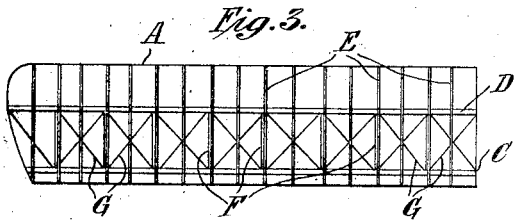
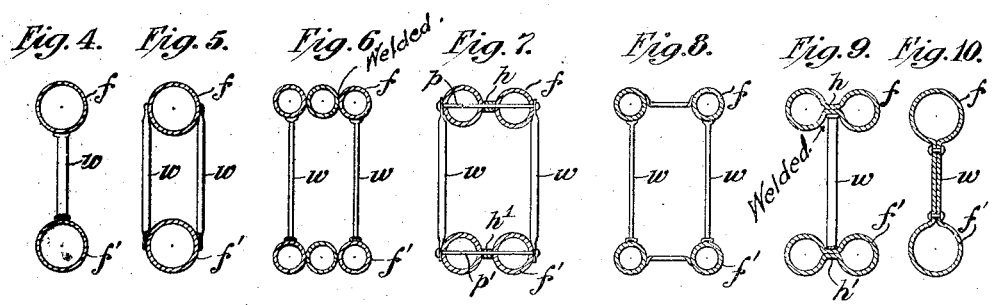
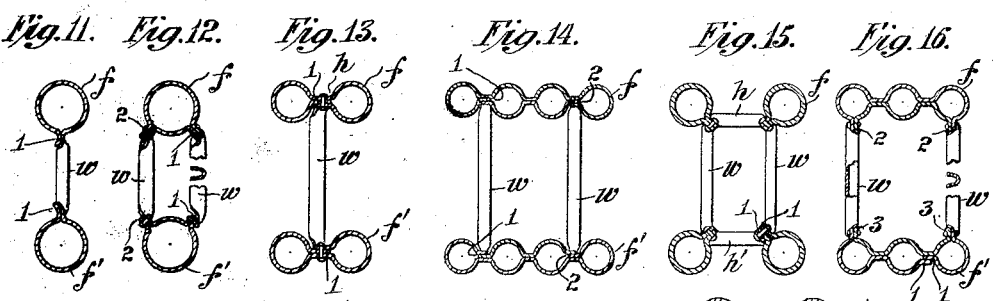
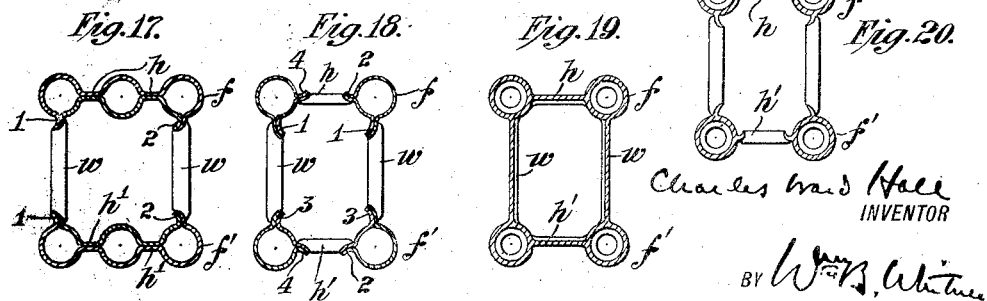
Charles Ward Hall
INVENTOR
BY Wm. B. Whitney
ATTORNEY

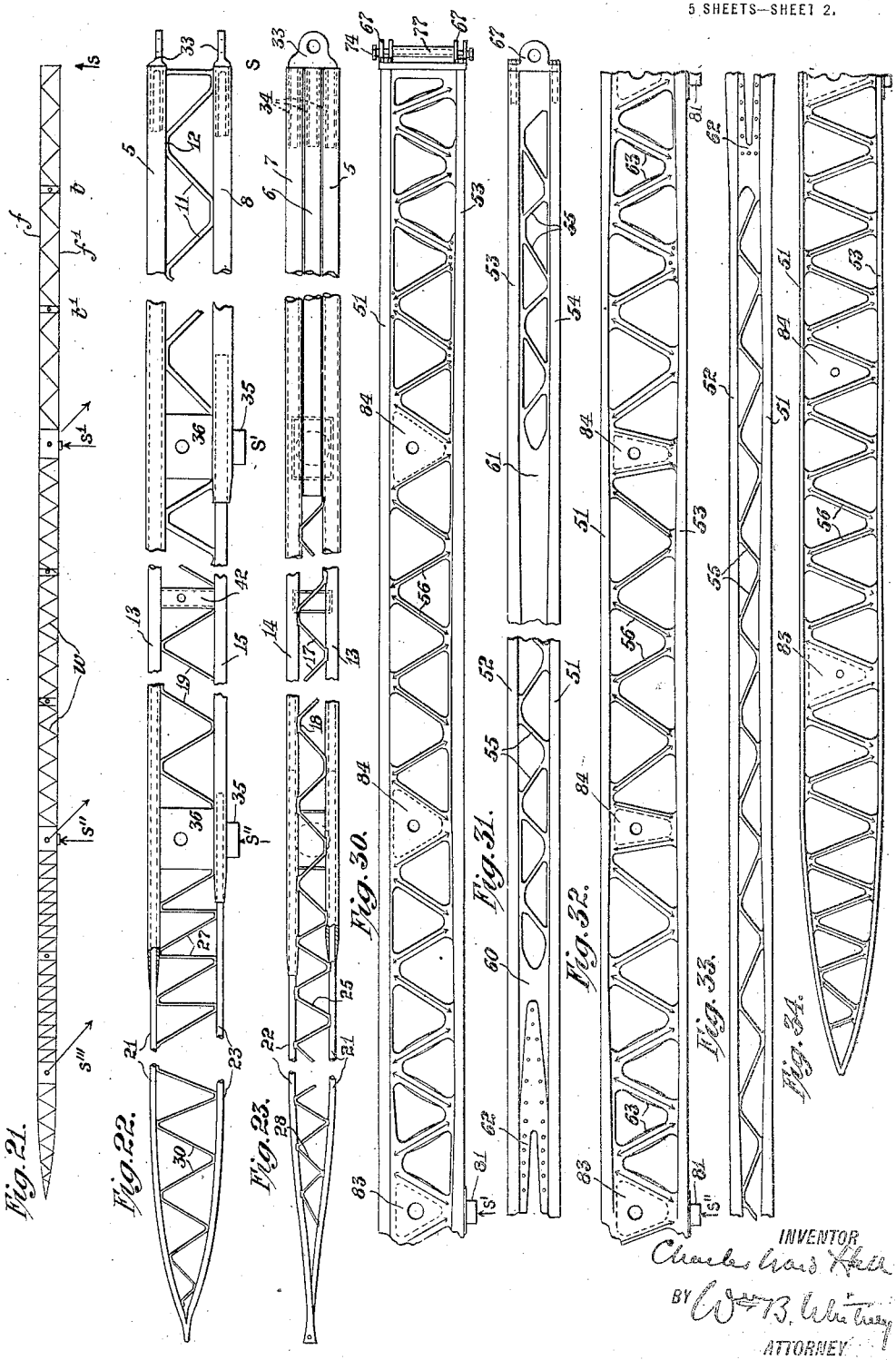

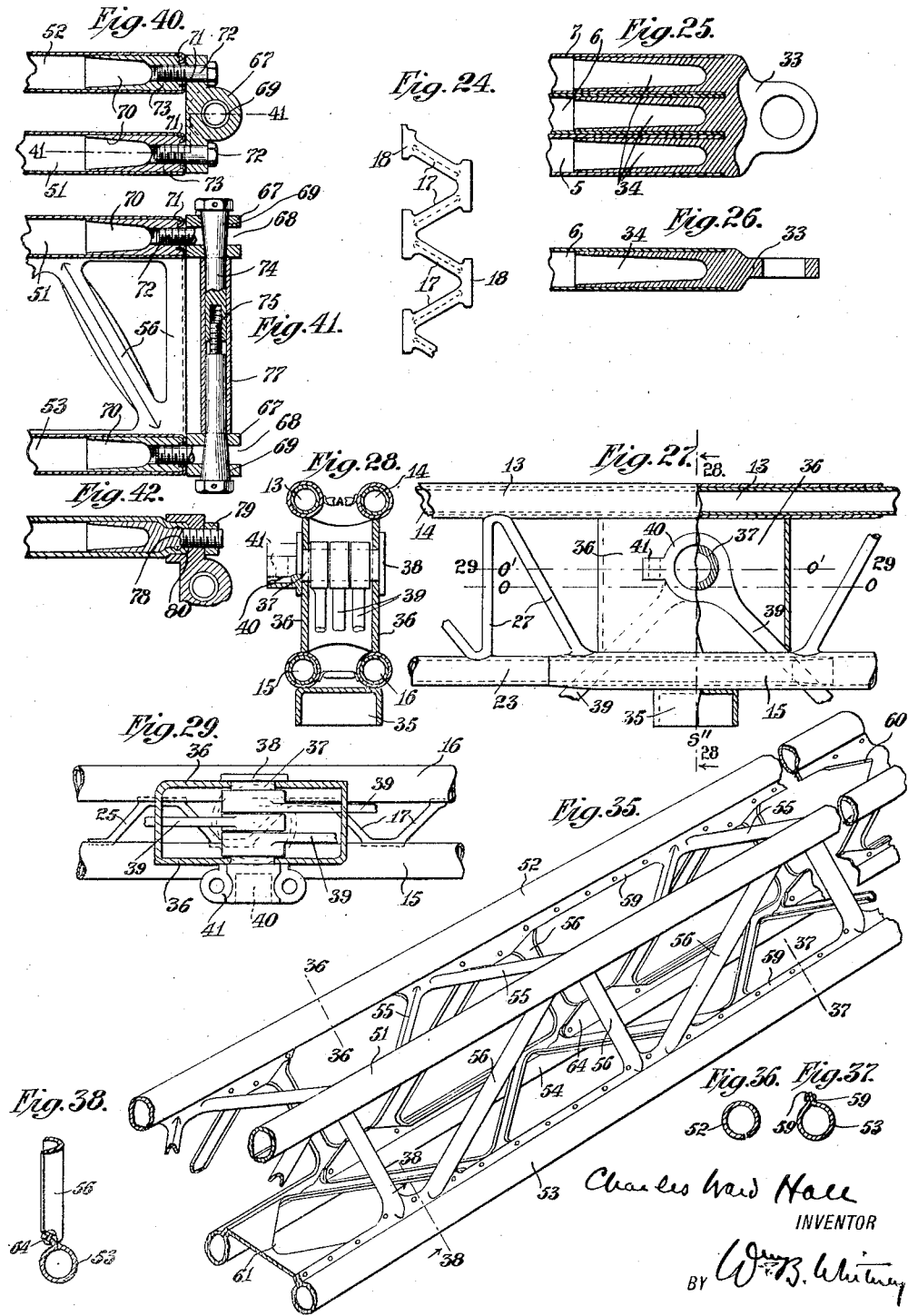

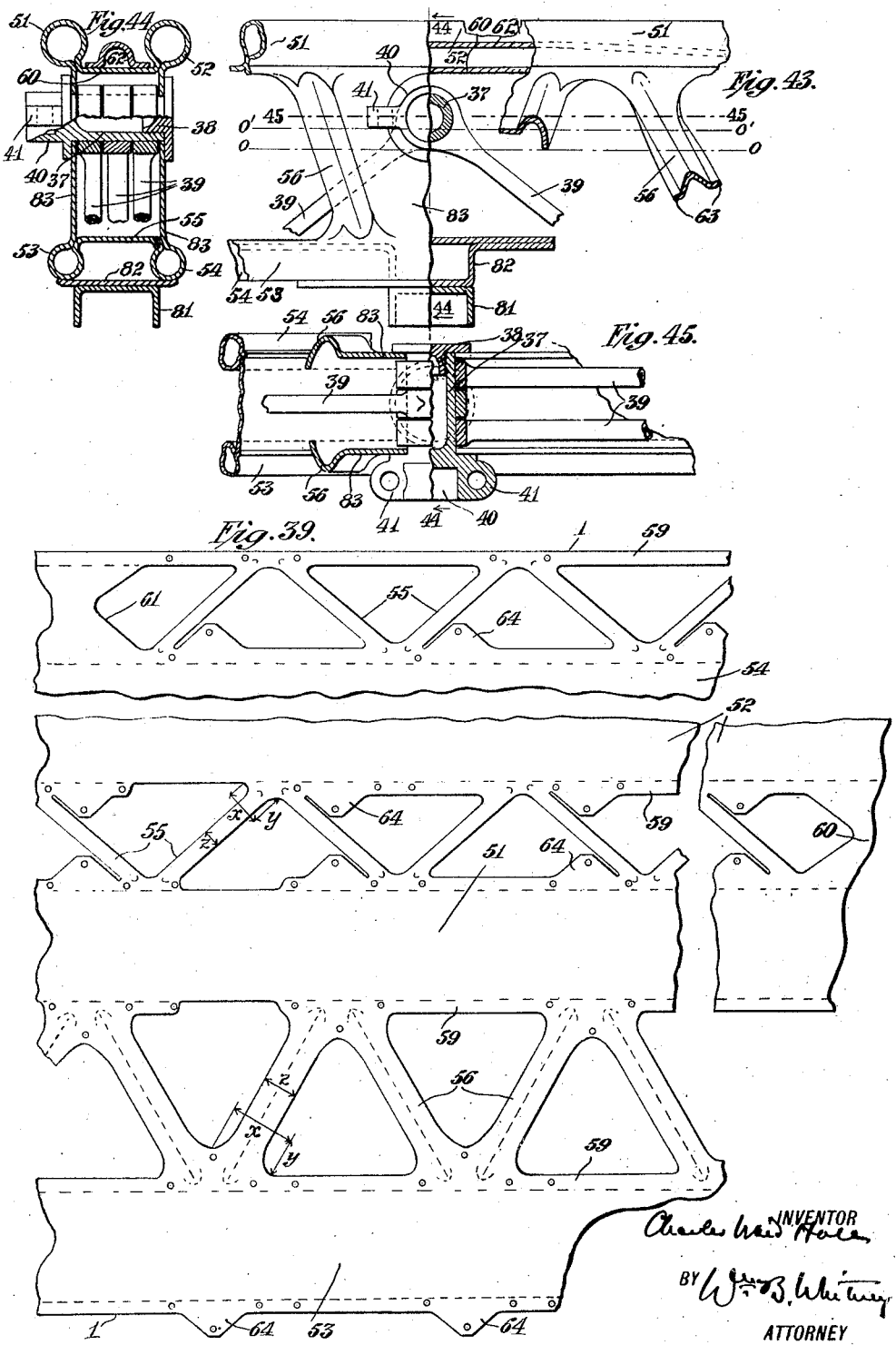

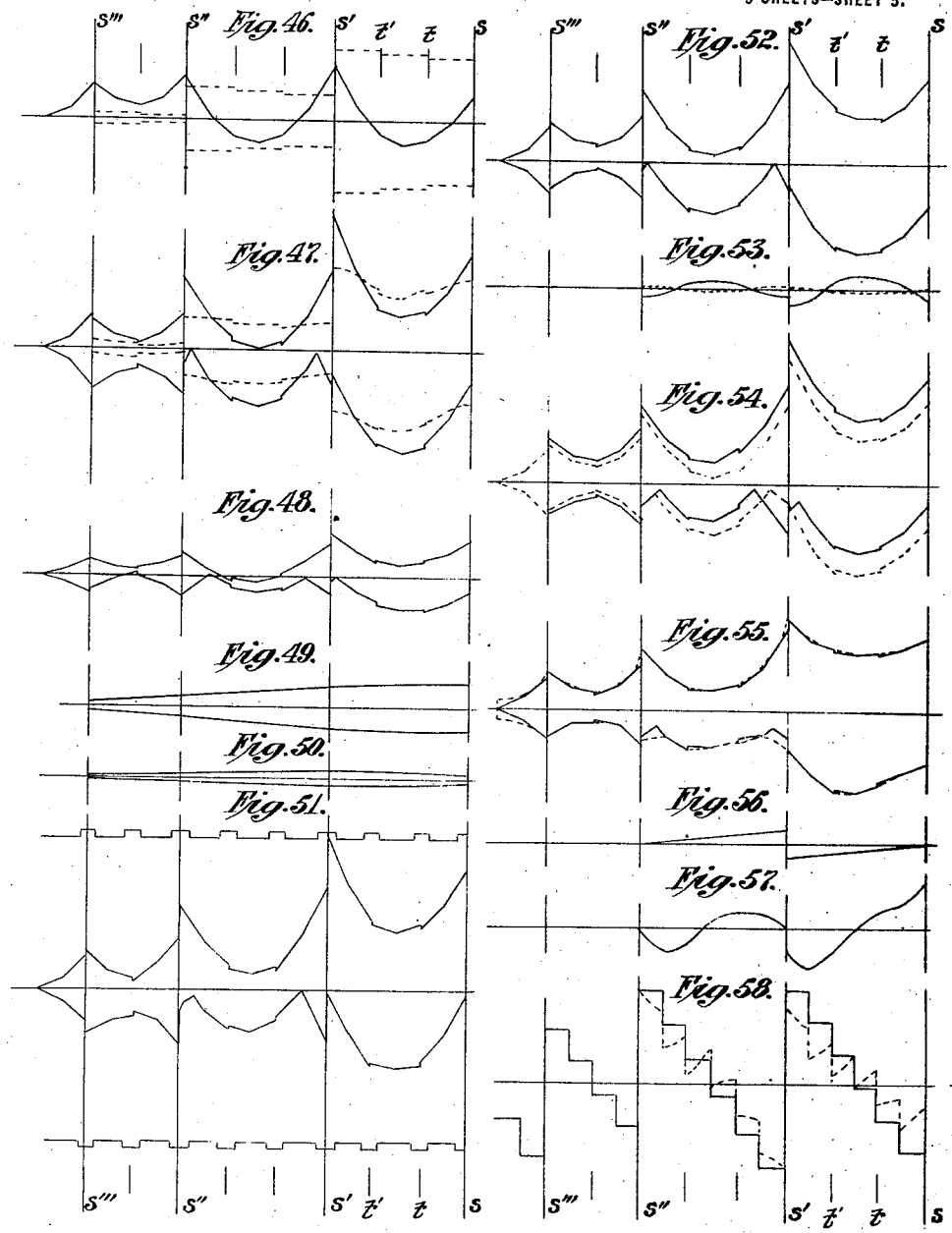

Patented Oct. 10, 1922.

1,431,521

UNITED STATES PATENT OFFICE.

CHARLES WARD HALL, OF LARCHMONT, NEW YORK.

TRUSS.

Application filed May 24, 1919. Serial No. 299,583.

*To all whom it may concern:*

Be it known that I, CHARLES WARD HALL, a citizen of the United States, and a resident of Larchmont, county of Westchester, and State of New York, have invented certain new and useful Improvements in Trusses, of which the following is a specification.

My present invention relates to a truss, of steel or other suitable material, which is especially designed with a view to its use in more or less modified forms for certain of the component parts or sub-divisions of a complete airplane frame, such as wing spars, ribs, and fuselage, and may therefore be considered to a certain extent as an improvement on the metallic truss system of construction for the framework of an airplane described and claimed in an application heretofore filed by me on the 24th day of October, 1917, Serial No. 198,209.

The object of this invention is to provide a structural truss the members of which, both the flanges or chords and the connecting web system, are so shaped, proportioned, and united as to give practically fixed end column conditions at the panel points and to have at all points substantially the minimum sectional area of metal required to safely carry the maximum fibre stresses to which it will be subjected; in other words, to provide a truss in which the required or maximum strength is secured with a minimum weight of material—a desideratum of especial value in airplane construction.

In the prior application referred to, I have described a system of framework, of trussed construction, in which the trusses are stamped from sheet metal and the chord and principal web members, integral at their points of intersection in the corners of the panels, are shaped up to a hollow open section peculiarly simple and easy to manufacture, the web members being upset at their ends to avoid eccentric loading and with joints concentric to provide fixed end column conditions, and are tapered by varying the width of the metal both within a panel and from panel to panel so as to give them at each point throughout their length moments of resistance substantially proportioned to the maximum fibre stresses thereat.

It is known that for any given ratio of thickness of material to length of side a closed hollow section is stronger, for a member subject to direct axial compression or pure column action, than is an open section; and that of the various practicable closed sections the circular is the more economical in weight, the relative economy decreasing with the ratio of thickness to diameter, that is to say, the relative economy of tubular as compared to hollow square or other sections of the same cross-sectional area is greatest where the diameter is large and the thickness is small. In members of solid section there is little choice between different sectional shapes provided that the maximum and minimum diameters are nearly equal. Further, for any given length area and form of section there is some one definite diameter to thickness ratio which is strongest and consequently most economical in weight, and any increase in diameter with reduced thickness or decrease in diameter with greater thickness will exhibit less strength than this optimum. This is true whether for open or closed sections, but at a different ratio of diameter or width to thickness and likewise of a different order for flat than for curved sided sections.

By length as here used is meant unsupported length, since a column rigidly supported at intervals by suitable lateral bracing is in effect resolved into a series of shorter columns standing end to end under flat or fixed end conditions. Thus, when the supports are in two planes approximately perpendicular to each other and pass through the axis of the member at a given point, the length as a fixed end column is the distance between such supports or braces. And when the braces in one of such planes are of a different spacing than those in the other plane, then the separation of those braces with the greater spacing determine the length if the section is symmetrical, but if an unsymmetrical section is used the ratio of length to radius of gyration for each condition of support spacing may be made the same so that failure is as likely to occur in one plane as in the other.

Column failure is due for short lengths to pure compression, producing at stress practically equal to the ultimate strength a flow of the material sidewise in a solid bar and at stresses below the elastic limit, a buckling or wave-like bending of the material in thin closed or open hollow sections, the wave length being proportional to twice the square root of the sectional area, for which sections this buckling and not the compression strength of the material determines the strength of the member. For intermediate lengths the buckling condition determines the strength, the exact proportion of upper to lower limit of length over which the strength is substantially constant being determined by the ratio of thickness to diameter rather than by the ratio of length to diameter, and stresses beyond the elastic limit produce marked and permanent distortion. With extreme lengths the limit of strength is controlled by elastic deformation, so that the sustained stresses being less than the elastic limit, the column will return to straight condition after the removal of the loading; and these lengths vary from a length to radius of gyration ratio of about 120 for a solid bar to one of about 240 for a thin hollow section or tube, intermediate relations of thickness to diameter ratios giving ratios of length to radius of gyration intermediate that at which this type of failure takes place, while the load sustained after failure begins is much less than that producing the original bending.

In a framed member subject to beam action only, and consequently to transverse or bending stress but no direct axial stress, the chords are in compression (acting substantially as columns between points of loading) and in tension respectively, according to the direction of loading and to a degree determined by the load, the depth of the beam, the length of span between supports, and the condition of the ends over the supports, and sustain practically all of such compression or tension, while the web connecting the chords carries practically all of the shear. If freely supported at the ends, the chord nearest the direction from which the load is applied will be in compression throughout its length, with values varying from zero at the ends to maximum at some intermediate point, and the chord furthest from the direction of applied loading will be in tension similarly distributed. When the ends are fixed, as in a continuous girder loaded downwards on all spans, the upper chord is in tension over the supports and in compression through the central portion of a span, the lower chord is oppositely stressed, and there are two neutral points or points of zero bending moment, one on each side of the center and between it and the supports, which are known as points of contraflexure. For any limited total depth the further the centers of gravity of the two chords are separated from each other, or, in other words, the greater the distance of each from the neutral axis between them, the stiffer will be the beam—a condition which is realized when the chords are flat plates of extreme thinness, up to that ratio of thickness to width where buckling or secondary failure is imminent, as this occurs at a comparatively early stage the use of a hollow enclosed section particularly or a plurality of such, for a flange which is to act in compression is more efficient in spite of the reduced effective depth of truss involved.

I utilize the above stated principles in my improved truss by using tubular sections, so far as practicable under the particular conditions, for all truss members subject to compression stress, and thus, the tubes being suitably tapered by varying either their diameter (i. e., width of section, as in my prior application) or thickness or both diameter and thickness, secure the main object of my invention.

The practical considerations which govern the construction of a truss to meet widely divergent conditions are well illustrated in the designing of the spar trusses of an airplane.

The constituent parts of a complete airplane frame are all subject, to a greater or less extent, to a combined column and beam action; and it will be found for each part that the most stressed truss members carry loads from 10 to upwards of 100 times as great as do the other members of that part which are least stressed.

Moreover, the spars, in addition to the bending or beam action due to the lift and drift resultant which puts portions of both chords in compression and portions thereof in tension, are subject as a unit to column action both as members of a truss composed of the front and rear spars in each wing and the drift struts and wires and, particularly in a multiplane, as members of a second truss composed of the upper and lower wing spars and the lift struts and wires.

Thus, in that portion of the spar near the tip of the wing which overhangs as a short cantilever beam action only exists for a front spar, but for a rear spar there is combined with this a small element of truss action due to the drift. In the next section or panel, between the outer lift wire and the outer lift strut, the beam action predominates but is combined with considerable column stress, either direct compression or direct tension, due both to lift and drift. In the next pannel, between the outer and middle lift struts, the stresses due to column and to beam action are approximately equal. While in the inner panel next to the fuselage, and usually in other intermediate panels, direct compression or direct tension stresses, due to both of the truss conditions above enumerated, greatly predominate over the stresses due to bending, this being particularly true of the upper rear and lower front spars for which the drift stress and the lift stress have the same sign, whereas for the upper front and lower rear spars these stresses are of opposite sign.

The deflection under loading of the wing truss as a whole results in stresses, sometimes large in amount, which for the deflection in the plane of the lift truss produces compression in the upper chord and tension in the lower chord of the spar of intensity increasing from the tip towards the root but varied somewhat by the nature of the root connection; and for deflection in the plane of the drift trussing produces compression in the rear part and tension in the front part of the chord of each spar. Both above statements are true for normal flight. For upsidedown flight the sign of the stress in upper and lower chord for lift is reversed, for drift the sign remains constant.

A further cause of stress is the torsional movement due in some attitudes of flight to the eccentric position of the lift-drift force vector in respect to the gravity axis of the entire wing truss and which for normal flight increases stress in the upper front and lower rear spars of a multiplane and decreases the stress in the upper rear and lower front spars. This is usually not large in amount for an orthogonal biplane as illustrated but becomes relatively important as a pronounced stagger forward of the upper plane is used. Further secondary stresses, sometimes relieving, sometimes increasing, the primary stress are due to the arrangement and relative stiffness of the various truss members but in so slender a truss as an airplane spar and with panel subdivisions of the type here shown these are usually of very small intensity.

In the usual spar arrangement the lift stresses predominate over those due to drift. The bending stress due to lift action invariably predominates over that due to drift, the lift and drift resultant being nearly but not quite perpendicular to the line of flight. The web stresses of the spars, more particularly those most stressed in compression, are no longer simple as in an ordinary beam over two supports, but, in addition to its ordinary function of transmitting the direct shear to the supports, the web system performs the service of lattice bars as for a column, together with a transfer of stress from one to the other chord at the points of contraflexure due to continuous beam action and likewise at points where the gravity axis of the spar is not parallel to its axis of symmetry. Both the web and the flange stresses are two complex to yield readily to graphical solution but are exactly ascertainable by computations conforming to elastic theory.

The problem of desiging a spar truss is therefore, in its lowest terms, that of providing a most efficient column section for the inner panel nearest the fuselage, a section of greatest combined column and beam efficiency for the intermediate panel or panels, and for the outer end a section efficient particularly as a beam; proportioning the actual area of each chord and of each part thereof, and of each of the several web members, to the computed stresses thereat.

So far as pure column action is concerned, the depth of section allowable being limited and the supports in one plane being separated several times as far as the supports in the other plane, a section of four tubes joined together in pairs side to side or by webs and each pair connected to the other pair by webs is probably the most efficient. But, to provide for the combined beam and column action to which a spar is subject, the use of a plurality of closed sections joined side by side to form each chord and of a suitable open web or webs to connect the two chords affords the optimum condition for light weight and high strength.

The number of such parallel tubes is determined by the total area of section required to meet the particular conditions. the length of chord between the lattice web members (or the stiffness of the web if solid), the distance between the drift struts or horizontal braces, the lift panel length, and the considerations regarding column failure above set forth.

The unit area of each tube is determined in part by the necessity of using an arbitrary number of tubes, say 1, 2, 3, or 4 at a like proportion of the total area of the chord, which limits the selection in this respect, and in part by the weight of the web, which is governed as follows, viz: For a given panel between loadings the web vertical stress is substantially constant and, considering the web alone, could if possible at moderate inclinations be carried most economically by a single diagonal tension and a single diagonal compression member, while, the stress along the web member being determined by the angular relation of the member to the chords, by increasing such angle and thereby the number of web members per unit of chord length, this stress will be borne by each of a plurality of members instead of by one only, but the total weight of web will become excessive if the members are unduly multiplied in number. Evidently, for a given chord area, a closely spaced web system permits a larger number of tubes to be used in the chord, and hence a ratio of thickness to diameter of tube more nearly resulting in full crushing strength of the metal, wave or secondary stress failure occuring at a lower thickness to diameter ratio. Increasing the number of the tubes, however, involves a reduction in the actual thickness of the tube walls, and this in turn affects the thickness to diameter ratio of the web members when, as in my earlier application, the chord and web members are shaped up from a single sheet of metal.

In addition, convenience in the matter of proportioning the chord sections of adjoining panels with relation to those of the panel under consideration narrows the selection in a given case to a choice usually between the use of 2, 3, or 4 tubes for each chord, in small airplanes, one of which numbers will show marked superiority over the others and determine the design in that particular case. Planes of large span, with many lift panels, if also of high aspect ratio may require the use of half a dozen or more tubes for each chord in those portions of the spar near the fuselage. A chord consisting of a single tube, i. e., two tubes only per spar, is extremely uneconomical at any point and should be used only near the tips or outer ends of certain spars where the small stresses met with require such a slight sectional area that, if more than one tube were used, either the tube walls would be thinner than commercially practicable or the tubes would be of so small a diameter as to necessitate an undue increase in the number of the web members, themselves of extremely thin material. Whenever such a section is indicated, the better plan is to form each chord by distorting a single tube, by rolling or re-rolling, into approximately dumb-bell shape.

For a given grade of material a drawn seamless tube is stronger than one formed by welding or by riveting along a seam, and such a tube can be tapered by redrawing or rerolling so as to reduce either its inner or outer diameter or both and thereby vary its sectional area. Complete chords whether of single or joined multiple tubular section can be produced directly by the extrusion process, without the necessity of joining several tubes or of deforming one originally circular tube; and when this process is used the inner diameter, and hence the sectional area, of the tubes and the thickness of the webs is under easy control and may be varied at will. Where large quantities of spars from a single design are required the use of such special tapered tubes will be justified. Rolled or drawn tubes may be conveniently tapered from lift panel to lift panel by using successive lengths of tubes of progressively smaller diameter and joining these lengths together, at the panel points where there are considerable changes in stress, by telescoping the ends of adjoining lengths, making a tight fit, and welding, brazing, or riveting the joint. The overlapping of the two lengths of tube should extend a sufficient distance each side of the point of support to afford the additional sectional area required to provide for the large negative moment frequently found thereat. When tubes are thus lapped and jointed the inside of the inner tube should be reamed out near its end so as to taper the tube walls to a thin edge and the outer tube should likewise be tapered exteriorly to a thin edge at its end, since such a joint is not only stronger than one of the same sectional area where such area is suddenly changed but withstands repeated reversals of stress or shock to a far greater extent. Such joints, particularly if brazed or soldered, develop the full strength of the members which invariably fail outside of the joint; whereas, with a butt ended joint, cracks develop at some lower strain at the end of the joint and progressive separation follows; the reason being that the small area of the tapered end is insufficient to break the brazed bond and the stress is transmitted gradually through the joint from one to the other member instead of being concentrated at one point. The change in sectional area of the chord from one to an adjoining more lightly loaded panel, and within a panel near points of contraflexure, may also be effected by omitting from the chord in such second panel or adjoining length one or more of the tubes used for that of the first panel or length. In case the chords, of either single or multiple tubular sections, are shaped up from sheet metal the proportioning of their sectional area to the stresses is under perfect control, within the limits required, merely by varying the width of metal in the blank (as in my earlier application) and there by the diameter of the tube or tubes formed therefrom, or, as is also practicable, by rerolling to suitably varying thicknesses the metal sheets, originally of uniform thickness, to thereby vary the thickness of the tube walls, both intrapanel and from panel to panel if desired; the latter method, particularly for intrapanel variations of the sectional area which can be proportioned from point to point in exact ratio with the variations of stress at such points by such changes in the thickness and without change or with only slight change in the diameter of the tubes, permitting more simple machine operations in manufacture than the first.

A lattice web of tubular members, either the vertical web or a horizontal web to connect together the tubes of a chord, may be made by bending a length of tubing to zigzag form and shaping the sides of the tube collapsed at the angles to fit the chord surface to which they are to be joined by welding, brazing, or riveting. Where such web sections are to be riveted I prefer, while or after flattening and shaping the tubing at the angles or points of contact, to expand the rivet holes rather than to drill or punch them so as thereby to retain the full sectional area of the tube, this being particularly important, in the tension members. When electrically welded, it is a convenient method to drill a depression in the chord tube at each point where the web is to be attached, the sharp edge of the depression serving to start the weld and to properly center the weld. For such a web it is more convenient to vary the resistance to shear by steps rather than progressively, forming several of its members from a tube of one size, several more from a tube of a different size, and so on, although in special cases the use of a tapered tube may be warranted.

The web system may also be shaped up from sheet metal blanks, the sheet being left solid where more sectional area is required and cut out and formed into a lattice web where less area is required; and this is the preferred method where the chords also are made up from sheet metal, since, as in my earlier application, the chord and web members can then be made integral at their points of concurrence. A disadvantage in this construction is the practical necessity, due to manufacturing considerations, in a truss structure so small as a spar, of using open instead of tubular or other closed sections for the web members, which thus require more material for the same strength. This disadvantage, however, is in all cases largely offset by the stiffness of the integral joints, above mentioned, and the ease with which the sectional area of each web member may be proportioned to the stress, and does not apply to larger structures, such for instance as a fuselage, where it is practicable in a subsequent operation to roll together the edges and form split tubes of the web members.

Where the material used is aluminum or its alloys, which cannot be satisfactorily soldered or brazed in its hard rolled form and in other forms is too soft for this purpose, this type of construction is limited to either forming chords and web from sheet metal and riveting where necessary or using tubular or multi-tubular chords produced by the extrusion process and web members preferably of zig-zag tubing flattened at the angles and there riveted to flat surfaces of the chords, or extruding the entire spar.

Owing to the wide divergence of the loads carried by the members of trusses used in airplane construction, it will be found, were an exact proportioning of material to stress attempted to be carried out through its entire range, that having selected the most efficient section for the members supporting the greatest stress, for instance the tube which in bent sheet metal is relatively difficult to make, it is not practicable to form this type of section out of the extremely small bulk of material required at the points of minimum stress. At such points, therefore, and particularly in the web system of the truss, some simpler form of section is preferable.

By numerous laboratory tests I have determined a number of sectional forms each of which is best suited to some particular condition of bulk of material available, the length of the member, and the thickness to diameter ratio practicable at such point. This ratio is controlled to some extent, where integral chord and web members are formed from sheet metal, by the practical limits of variation of thickness possible in a single sheet, and particularly from considerations of the contrary requirements in web and chord at certain contiguous points in a panel length.

For simple angular sections I have demonstrated that the greatest efficiency is obtained when the sides or legs are at an angle of 55 degrees to each other, the section having then equal resistance in all directions instead of a maximum and minimum in planes at right angles to each other, and such a section is as efficient as any where the thickness to width of sheet ratio is 1/12 or more and the slenderness ratio as expressed by length to radius of gyration is 30 or more. With lower ratios of thickness to width of sheet, approximately 1/15 to 1/25, a V section with legs at 50° to each other having the edges of its sides bent over to form flanges of a width varying from about twice the thickness for long members to three or three and one-half the thickness for short members has an efficiency about equal to a 3/4ths circular or C section of the same thickness and width of sheet and by suitably lacing such a section across the flanges, as is practicable in V sections of the size used in a fuselage, by welding or riveting (where riveting is necessary) the corners of a zig-zag lacing cut from a much thinner sheet of metal and upset to V shape to stiffen its diagonal members, is in thickness to width ratios of 1/40 to 1/120 and moderate to extreme lengths capable of sustaining as high unit stresses as a tubular section proportioned to like ratios. In both sections, whether with or without flanged edges, there is substantial advantage in tapering the member, making it larger near the center and smaller near the ends as described in my prior application.

With thickness to diameter ratios from a minimum and in medium lengths as expressed approximately by a length to radius of gyration ratio equal to 30 or more, a tubular section having an open seam or slot along one side is as efficient as any; but, where the ratios of thickness to diameter or length to radius of gyration or both are extremely small, the wholly closed tube, either drawn or formed by welding or riveting together the outwardly flanged edges of a bent sheet, is most efficient although in a sheet metal truss obviously involving much more labor in construction, and the necessity for using such relatively expensive section can usually be avoided by a suitable tapering of the thickness of the walls of an open seam tube. The tests made prove that in the case of rolled tubes, except for very short lengths, a thick wall tube which has been sawed longitudinally through one side is fully as strong as the original tube, failure in all cases occurring, by simple bending under round end conditions and bending in a sinusoidal curve under fixed end conditions, at right angles to that diameter in which the slot is located. For extremely short lengths, or at moderate lengths for tubes the walls of which are thin relative to the diameter, failure is by collapse of the edges, which are bent inwardly or outwardly, and occurs at lower unit stress than for similar unslotted tubes. In extremely long lengths and for ratios of thickness to diameter not smaller than usually manufactured there is no appreciable difference in strength.

Whatever the sectional shape of the members may be, the size and proportions of the fillet through which one member is joined to another is of extreme importance. This fillet, which is tapered usually in concave curves, should have a width along the supporting or chord member preferably two or three times, and a length about twice, the width of the material in the member which it supports. Such a fillet, together with an upsetting which will bring its gravity axis into the plane of the fillet, will suffice to realize fixed end conditions at the panel corners for the supported, usually the web, member where its length to radius of gyration ratio is medium or larger; but, where such ratio is small, to realize full fixed end conditions the edge of the supporting, or chord, member opposite that to which the fillet is joined should also be tied to the fillet by a suitable lug. I have demonstrated that in rib trusses such a secondary reinforcement of the fillets of a few only of the most stressed web members effects, without appreciable increase in weight, an increase in the strength of the rib as a whole of approximately 60 per cent.

I prefer, therefore, to use one of the two V or U sections described, rather than a circular section, for the webs of spar and rib trusses which have tubular chords shaped up from sheet metal for the reason that the thickness of metal used is determined by the flange conditions and in general would give too small thickness to diameter ratios to make tubular sections practicable here, and also because, in the small sizes of web members permissible in either spar or rib construction, the lug on the opposite edge of the chord member can more readily be attached to the fillet of a web member of such section than to one of tubular section. An integral lacing of V form is the section preferred for the horizontal webs used to connect together chord tubes of steel in spar trusses and also for the vertical webs of such trusses near the wing tips where tubular sections if used would necessarily be so small as to preclude the possibility of the thorough inside cleaning required for welding together the two collapsed sides of the web tubes at the angles or points at which they are joined to the chord.

For the chords of rib trusses a tubular section shaped up from sheet metal but with edges turned outwardly to form flanges which are riveted or welded together at the panel and occasional intermediate points forms an efficient section since the bending load does not tend to produce failure in the same direction as does the compressive loading, these tendencies being at right angles to each other.

And for fuselage construction, both because the stresses in corresponding parts of chord and web diminish or increase together and because of the larger dimensions of the parts, chords and webs of tubular type, preferably forming a four-sided fuselage made up of four tubular longerons connected by a tubular web system, will give the utmost economy of material. In such case, the two sides, each including an upper and lower longeron and connecting vertical web, are shaped up from similar sheets of metal which are tapered in thickness towards both the forward and rear ends, the upper sides is formed by a horizontal web formed from a similarly tapered but lighter sheet throughout, and the bottom horizontal web from a sheet still lighter than the upper web for the reason that in nearly all airplanes the rudder center of pressure is unsymmetrical to the axis of the fuselage and usually considerably above it so that ruddering produces not only a direct side pressure but also a twisting action upon the fuselage which in the top web augments the stresses due to the side pressure but diminishes them in the bottom web.

The rib and spar trusses should for economical design be so correlated in the wing frame, as pointed out in my earlier application, as to mutually provide diagonal bracing across the chords for resisting the tendency in such trusses to secondary failure through collapse from a rectangular into a diamond shaped section. In metal construction, therefor, these trusses have an inter-relation and mutual dependence upon each other for stiffness which does not exist in current or past forms of wooden construction, since, on account of the nature of that material, it is essential that the thickness both of web and chord be comparatively large or, what amounts to the same thing, the chord projection beyond the web is usually less than the thickness of the chord itself.

The invention, which embraces within its scope the several features and combination of elements particularly pointed out in the appended claims, will be clearly understood by reference to the accompanying illustrative drawings, in which—

Figure 1 is a view, in front elevation, of one-half of a biplane, of ordinary type; Fig. 2, a view of the same machine in side elevation; and Fig. 3, a plan view of the upper wing shown in Fig. 1, with surfacing cloth removed. Figs. 4–20 are cross-sections of trusses which, differing in form or construction, or both, all embody features of my invention. Fig. 21 is a diagrammatic view, in side elevation, of an upper wing spar, illustrating an efficient and economical spacing of the lattice web members in its several lift panels; Figs. 22 and 23, enlarged views, in side elevation and plan respectively, of the spar, showing a construction mainly of seamless tubing; Fig. 24, an enlarged detail view, showing in plan, a portion of a blank from which is shaped up the horizontal webs uniting the chord tubes in the intermediate and outer lift panels of the spar; Figs. 25 and 26, enlarged detail views, in horizontal and vertical section respectively, of the hinge member which is attached at their inner ends both to the upper and lower chord tubes of the spar; Fig. 27, an enlarged detail view, partly in elevation and partly in section, of a portion of the spar over a point of support, showing the means provided thereat for the attachment of the lift and drift struts and wires; and Figs. 28 and 29, sectional views on the lines 28 28 and 29 29 of Fig. 27, respectively. Figs. 30, 32 and 34 are views, in side elevation, of the inner, intermediate, and outer lift panels, respectively, of a somewhat similar spar constructed of sheet metal, and Figs. 31 and 33, respectively, a bottom plan view of the inner, and a top plan view of the outer, half of the inner lift panel and a top plan view of the adjoining intermediate lift panel thereof; Fig. 35, an enlarged perspective view of portions of this sheet metal spar, and Figs. 36, 37 and 38, sectional views on the lines 36 36, 37 37, and 38 38 of Fig. 35, respectively; Fig. 39, a plan view of the blank from which is shaped up the portions of the spar shown in Fig. 35; Fig. 40, an enlarged detail view, in horizontal section, of the hinge member which is attached to both the upper and lower chord tubes of the spar at its inner end, and Fig. 41, a section through both upper and lower hinge members on the line 41 41 of Fig. 40, showing the hinge pin; Fig. 42, a view corresponding to the upper half of Fig. 40, showing a modification; Fig. 43, an enlarged detail view, partly in elevation and partly in section, of a portion of the spar over a point of support, showing the means provided thereat for the attachment of the lift and drift struts and wires; and Figs. 44 and 45, sectional views on the lines 44 44 and 45 45 of Fig. 43, respectively. And Figs. 46–58 are diagrams of the flange and web stresses, at the incidence of maximum lift, in an upper front spar such as illustrated in Fig. 21, with and without the refinements in construction shown and described; the abscissae representing units of spar length and the ordinates being proportional in Figs. 46–55 to the stress in the chords (those above the base line to the stress in the upper and those below the base line to the stress in the lower chord) and in Figs. 56–58, on a much larger scale to the stress in the webs.

The same reference characters indicate the same or similar parts throughout the figures of the drawings.

Referring first to Figs. 1–3, A and B are the upper and lower wings of the biplane illustrated. The framework of each wing, the upper wing as shown, comprises front and rear spars C and D and the customary series of ribs E, and is braced by a series drift struts F and the usual drift and counter-drift wires G. The frames of the two wings are connected together as usual by inner and outer lift struts H and I and, preferably, by inclined lift struts J in place of the outer lift wires ordinarily used, the struts being arranged in pairs one to connect the forward and the other to connect the rear spars, and are cross-braced in the usual manner by lift and counter-lift wires K and incidence wires L. The air forces which operate upon the wings when the machine is in normal flight are indicated by dotted lines in Fig. 2, the vertical line $a\ b$ representing lift, the horizontal line $b\ c$ representing drift and the inclined line $a\ c$ representing the lift and drift resultant.

The different trusses sectionally illustrated in Figs. 4–20, all adapted for use in the construction of wing spars, have upper and lower chords $f$ and $f'$, each of which is formed by or comprises a single tube or a plurality of parallel tubes and either one or two connecting lattice webs $w$, and the tubes in the chords and in the web system are, or may be, tapered lengthwise of the truss in such of the ways hereinabove described as is applicable to the construction shown. Where, as in the forms preferred the chords of the truss are made up of two or more tubes these tubes are either secured together side by side or are held more or less spaced apart by separators (Fig. 7) or horizontal lattice webs $h$ and $h'$.

As shown in Fig. 4, a relatively inefficient section used only in certain cases for the outer tips of spars, the chords of the truss consist each of a single seamless tube and are joined by a single lattice web of zig-zag tubing which at its flattened angles is so shaped and attached to the flange tubes that both web and chord members are in concurrent coplanar relationship and form concentric joints at the panel points. In the somewhat more efficient truss shown in Fig. 5, the single-tube chords are connected by two lattice webs, also of zig-zag tubing but flattened laterally at the angles, which are respectively welded at the panel points to opposite sides of the chord tubes. In Fig. 6, three tubes are shown as welded together side by side to form each chord, and each of the outer tubes of one chord is connected to the corresponding outer tube of the other chord by a web similar to that of Fig. 4 and attached in like manner to the chord tubes. The next truss, that shown in Fig. 7, has in each chord two tubes which are held apart by short separators and two vertical webs like the webs in Fig. 5, and the several truss members are riveted together at each panel point by headed pins $p$ and $p'$ which pass through the chord tubes and separators and the flattened portions of the webs. In Fig. 8, each truss chord consists of two seamless tubes and a connecting horizontal lattice web shaped up from a sheet metal blank, and each tube in one chord is connected to the corresponding tube in the other chord by a vertical web of zig-zag tubing, both horizontal and vertical webs being so attached to the chord tubes that their members form concentric joints therewith at each panel point. The double-tube chords of the truss shown in Fig. 9 are each made up from a single larger tube which is distorted into approximately dumb-bell shape, the flattened sides of the two tubes intermediate the two tubular sections being secured together and forming a narrow horizontal web, and the chords thus formed are connected by a single vertical web of zig-zag tubing welded at the panel points to the flat surface or horizontal web portion of each chord. The truss of Fig. 10 is made entirely from a single large tube by distorting it to approximately dumb-bell shape, the web formed between the single-tube chords by the flattened sides of the original tube being either left solid or cut out to open lattice form as desired. The truss shown in Fig. 11 is similar in section to that of Fig. 4, but, unlike the trusses shown in the preceding figures, its seamed-tube chords and integral lattice web of open hollow members are shaped up into concurrent coplanar relationship from a single blank the outer edges of which are indicated at 1 1. The truss illustrated in Fig. 12, corresponding in section to that of Fig. 5, is also of sheet metal construction and its single-tube chords and two lattice webs, with members of hollow open section integrally united with the chord tubes at the panel points, are shaped up from two blanks extending from 1 to 1 and 2 to 2, respectively. The truss of Fig. 13 corresponds closely in section to that shown in Fig. 9, but its double-tube chords and single lattice web, the latter with members of open hollow section upset laterally to avoid eccentric loading, are shaped up from a single blank of sheet metal having outer edges indicated at 1 1. In Fig 14, the four tube chords and two lattice webs of the truss, with web members of U section upset to bring their gravity axes into the plane of their supports at the chords, are shaped up from two sheet metal blanks the outer edges of which are indicated at 1 1 and 2 2, respectively. The integral truss shown in Fig. 15, also of sheet metal construction, is made from a single blank with edges indicated at 1 1, and the web members are of U section both in the horizontal webs which unite the two tubes of each chord and in the vertical webs connecting the chords. The sheet metal truss of Fig. 16, with its three-tube chords and two vertical webs, which connect each outer tube of one chord to the corresponding tube of the other chord and are in concurrent coplanar relationship therewith, are formed from three blanks the outer edges of which are indicated at 1 1, 2 2, and 3 3, respectively. The truss shown in Fig. 17 is similar to the preceding, but is made from two blanks having edges indicated at 1 1 and 2 2, respectively. The truss of Fig. 18, which is shaped up from four blanks extending from 1 to 1, 2 to 2, 3 to 3, and 4 to 4, respectively, and is adapted more particularly to fuselage construction, is somewhat similar in section to that of Fig. 15, but in this truss the open hollow members of the webs, both vertical and horizontal, form concentric joints with the chord tubes at the panel points. In Fig. 19 there is shown a truss whose double-tube chords and connecting horizontal and vertical webs, all tapered in thickness and integral one with the other, are formed simultaneously by the extrusion process; and in Fig. 20 the same truss is shown after its two vertical and lower horizontal webs, which as formed by this process are solid, have been cut out into open lattice form and their members shaped to open hollow section and upset into concurrent coplanar relationship with the chord tubes.

Coming now to the wing spars, which illustrate in their construction the utilization of several of the truss sections hereinabove described, $s$, $s'$, $s''$, and $s'''$, Fig. 21, indicate the points of support of an upper spar, the front spar C for example, at its inner end and at the points intermediate its length at which are attached the lift struts and wires. The spar is divided by these supports into four lift panels, and these panels are subdivided into drift panels by the intermediate drift struts and wires which are attached at the points $t$, $t'$, etc. The zig-zag lines represent the lattice members of the vertical web or webs $w$, which connect the upper and lower chords $f$ and $f'$, and illustrate an angular relationship, and consequent spacing, of such members appropriate for each lift panel length of the spar.

In the seamless tube structure shown in Figs. 22–29, a truss having the section illustrated in Fig. 6 is used for the inner lift panel length of the spar. Its upper and lower chords are formed, respectively, by welding together side by side the tubes 5, 6, and 7 and the tubes 8, 9, and 10, which, at their outer ends where their walls are exteriorly tapered to a thin edge, extend past the point of support and far enough into the next lift panel (considerably farther in the upper than in the lower chord) to sustain the peak of loading; and each of the two webs, formed of zig-zag lengths of tubing respectively connecting the tube 5 to the tube 8 and the tube 7 to the tube 10, comprises a series of inclined tubular members 11 and intermediate flattened connections 12, which, formed as hereinabove described by the collapsed walls, are welded together and to the chord tubes. The tubing of the webs is so tapered as to give to the web members a minimum sectional area through the central portion of the panel and a gradually increasing area towards and at each end, and the flattened connections are of such length and are so attached to the chord tubes that the axes of adjoining web members will intersect at a common point in the axis of a tube, thus forming therewith a concentric joint at each panel point. In the second lift panel of the spar, where the truss has a section similar to that shown in Fig. 8, the interiorly tapered inner ends of the two upper chord tubes 13 and 14 are telescoped into the outer ends of the tubes 5 and 7, for a corresponding distance beyond the point of support, and are brazed or welded thereto, the similarly tapered ends of the lower chord tubes 15 and 16 are in like manner joined to the tubes 8 and 10, and, as in the first lift panel, the outer ends of all four tubes with walls exteriorly tapered, are carried past the outer panel point into the third lift panel. The horizontal web, which completes each chord by uniting the two tubes thereof, is here shown as formed from a sheet metal blank (see Fig. 24) and consists of a series of lattice members 17, shaped to V section, and integral connecting fillets 18 which are so proportioned and upset (see Figs. 27–29) that the web members are concentrically joined to the chord tubes at the panel points. The two vertical webs, which respectively unite the tube 13 to the tube 15 and the tube 14 to the tube 16, are similar to the webs in the inner lift panel but, as shown, their members 19 are more closely spaced and consequently stand at a greater angle to the axis of the spar. The third lift panel is similar to the second but of lighter construction. Its upper chord tubes 21 and 22 and lower chord tubes 23 and 24 are at their interiorly tapered inner ends telescopically joined to the corresponding chord tubes of the second panel and at their outer ends extend through the outer lift panel substantially to the tip of the spar, while the V-shaped members 25 of the horizontal webs and the tubular members 27 of the vertical webs are more closely spaced than in the preceding panel. In the fourth or outer lift panel, the tubes extended from the third panel are gradually brought together both in the upper and in the lower chords, one of the two tubes in each chord being fitted and joined to the other which is flattened at the end by pinching together its sides, while both chords are brought together in curves and united at their flattened tips. The V-shaped members 28 of the horizontal webs and the tubular members 30 of the vertical webs of this panel are similar in construction to the corresponding members in the last preceding panel but in the vertical webs are spaced farther apart.

The spar is provided at its inner end with two members which together form one-half or leaf of a hinge joint, by which to attach it to the body of the machine or (in the case of an upper wing spar) to a central spar length, and at the panel points with suitable fittings for the attachment of the lift and drift struts and wires. Each of the two hinge members referred to consists, as here shown, of an eye-yoke 33 with three integral sleeves 34, taperingly hollowed to a thin edge at their outer ends (see Fig. 25). and the three sleeves of one member are telescoped into and there brazed to the ends of the three upper chord tubes while those of the other member are similarly joined to the three lower chord tubes. At each of the remaining lift panel points there is attached to the outside of the chord tubes, the bottom of the lower tubes of the upper spar shown, a socket piece 35 in which to fix the end of a lift strut, and the space between the two chords is boxed in by two elbow gusset-plates 36 which are welded together and to the chord tubes. The sides of these plates, which serve as portions of the vertical web system of the spar, are provided with circular openings, centered over the axis of the socket and somewhat above the axis of symmetry $o\ o$ of the spar, within which is fitted a headed hollow pin 37 secured in place by a flanged screw-cap 38; and upon this pin are mounted three eye-bar turnbuckle ends 39, the two outer ones for the attachment of a pair of lift wires and the middle one for the attachment of a single counter-lift wire, while the pin itself has formed in its head a socket 40 in which to fix the end of a drift strut and on opposite sides of the socket two laterally projecting lugs 41 with eyes in which to fasten the ends of a drift and counter-drift wire. It is to be noted that the greater sectional area of the upper chord over the two points of support where the chord tubes are telescopically jointed results in the shifting of the gravity axis o' o' of the spar from its axis of symmetry upward or towards the heavier chord, to an extent dependent upon the relative area of the two chords, and that by the means here provided and arranged as shown the lines of action of lift strut and wires and of drift strut and wires are all brought to a common meeting point in such eccentric gravity axis. The spar is similarly boxed in at its drift panel points by elbow gusset-plates 42, which need not be as long as the corresponding plates 36, and duplicates of the pins described are secured in like manner in openings in the sides of the plates and provide for the attachment of the intermediate drift struts and wires.

I have found, in way of example, that for an upper front spar twenty feet in length and of a depth of three and one-half inches constructed as shown and described of cold drawn steel tubing satisfactory results both as regards strength and weight can be obtained by using tubes of the following outside diameter and gauge, viz: For the chord tubes three 5/16 inch 24 gauge in the inner panel for each chord, two 1/4 inch 24 gauge for upper and two 1/4 inch 23 gauge for lower chord in the second panel, and two 3/16 inch 24 gauge in each chord of the third and outer panels; and, for the webs, tubing tapering from 5/32 inch 24 gauge at the inner end of the inner panel to 1/8 inch 26 gauge through its middle portion, back to 5/32 inch 24 gauge at and near the support in both first and second panels, to 1/8 inch 26 gauge through the middle of the second panel, to 5/32 inch 26 gauge at and near the support in both second and third panels, and from such point to 1/8 inch 26 gauge throughout the remainder of the spar.

The sheet metal spar shown in Figs. 30–42 corresponds closely in section to the truss sectionally illustrated in Fig. 15 and is likewise formed from a single blank (see Fig. 39) the outer edges of which are indicated at 1 1. The spar comprises four seamed tubes 51, 52, 53, and 54, upper and lower horizontal webs with lattice members 55 which respectively unite the two upper tubes and the two lower tubes and with them form the upper and lower chords of the spar, and two vertical webs with lattice members 56 each of which unites one of the upper chord tubes with the corresponding lower chord tube. The lattice web members, in the horizontal as well as in the vertical webs, are shaped either to a U or V section and are so upset as to bring their gravity axes into the plane of their integral supports at the edges of two tubes; the tapered fillet ends of these members having, as hereinabove explained, a width $x$ at the tube wall preferably two or three times, and a length $y$ about twice, the width $z$ of the unshaped web member (see Fig. 39). The upper and lower chords are as here shown given a varying sectional area proportioned closely to the maxima of the combined beam and column stresses to which they are subject by increasing the diameter and consequently the area of the tubes through the most stressed portions of the chords at and adjoining the ends of the lift panels, more particularly the inner panels, in the upper chord and along the middle of these panels in the lower chord during normal flight, but reversed, with lower stresses, under conditions of upside down flight, by also closing the seams of the tubes, which through the portions less stressed are left open (see Fig. 36), by fastening together the extended flanged edges 59 of their walls, and, further, by leaving portions of the horizontal webs solid, as at 60 in the upper and 61 in the lower web, and additionally reinforcing the web of the upper chord with a ribbed plate 62 at the point of maximum stress over the support $s'$. The vertical webs are also taperd from lift panel to lift panel and within such panels by varying the width of the material from which their lattice members are shaped up; and the most stressed web members, at and adjoining the ends of the longer lift panels, are not only made of wider material but are shaped preferably to a V section with outwardly flanged edges 63 tapering from the center towards each end. The fillet ends of these members, especially those subject to the highest stresses, are further reinforced and stiffened by attaching thereto lugs or ears 64 which are formed integral with the opposite edge of the tube walls (see Figs. 35, 38, 39). The spar as a whole is tapered at its outer end by bringing together and joining the ends of all four of the chord tubes.

The half hinge joint shown at the inner end of this spar (see Figs. 40 and 41) consists of an upper and lower member which are substantially alike and are of a form adapted for use with thin walled tubes of such material that they cannot be satisfactorily welded or brazed. Each hinge member comprises an eye-yoke 67, slotted at 68 as here shown and with tapered eye 69, and two hollow sleeves 70 which, after insertion in the ends of the upper or lower chord tubes and the rolling of the walls of the tubes inwardly over their rounded annular edges 71, are drawn tightly up against the yoke by bolts 72 screwed into their internally threaded ends 73. The hinge pin 74, tapered at both ends as shown, is made in two parts which screw together at 75, within a spacer tube 77, so that they may be drawn together from time to time to take up wear and maintain a tight joint. In the modified form of hinge member shown in Fig. 42, for use with thick walled tubes, each sleeve has a shank 78 which passes through the yoke and is secured thereto by a nut 79 on its threaded end, a cup-shaped depression 80 in the face of the yoke serving to pinch against the shoulder of the sleeve the end of the tube rolled thereon. Socket pieces 81, for the attachment of the ends of the lift struts, are here fixed to shaped plates 82 which in turn are fixed at each lift panel point to the tubes and web of one chord of the spar. At these same panel points the vertical webs are not cut away between the two adjoining lattice members, and in openings in the solid gusset-plates 83 thus provided there are secured the hollow pins 37, which, as already described, provide at one end the sockets 40 and eye-lugs 41 for the attachment of the drift struts and wires and upon which are mounted the eye-bar turnbuckle ends 39 for the attachment of the lift wires and their counters (see Figs. 43–45). The lines of action of the lift and drift struts and wires as here shown (Fig. 43) are centered at a point considerably above the axis of symmetry $o\ o$ of the spar and somewhat above the eccentric gravity axis $o'\ o'$ which has been shifted upwardly by reason of the relatively greater area of the upper chord over the support. Similar gusset plates 84 are left in the vertical webs at the drift panel points and other hollow pins are in like manner mounted therein to provide attachments for the intermediate drift struts and wires.

By providing the end of a spar with a hinge joint such as above described I am able to realize at this point a bending moment which may safely be taken as at least half as great as that resulting from full continuity, instead of the simple pin connection and assumed zero bending moment usual in wooden spar construction.

In the case of an airplane spar, where the loading originates from air reactions, the simultaneous stresses due to bending moment and to truss action are invariably in constant proportion to each other under conditions of normal flight, and it may also be safely assumed that the bending due to column action will be in the same direction as that directly produced by the original load in beam action when as here the width of the spar chord is greater in proportion to the length of a drift panel than is the spar depth to the length of a lift panel.

It is to be noted that, during normal flight, the lower chord of an upper spar at the center of the lift panels and its upper chord over the supports are subject to high compressive stress, whereas in the upper chord at the centers of the lift panels and in the lower chord over the supports the tension due to beam action partially offsets the compression due to truss action. These stresses are reversed in sense for upside down flight; but, due to the shape of the wings, the stresses in a spar during upside down flight can never be as great for corresponding linear and angular speeds as in normal flight, since the higher the lift coefficient of the wing section for the one condition the lower it must be for the other.

The relative value of the stresses in normal and upside down positions will vary from approximately three to one for wing sections of heavy camber and high lift to about three to two for sections of the flatter high speed type of wing, the average being usually about two to one. Consequently, in spite of the reduced intensity of the stresses in upside down flight, the changed sense of the loading makes the total stress, particularly in the lower rear spar and in the upper front spar, greater at some points in their length than is the total stress for normal flight.

By arranging the fittings through which the lift struts and wires are attached to the spars as herein shown and described, so that the lines of action instead of meeting at the axis of symmetry of the spar meet at a point somewhat above such axis, I produce in one lift panel of the spar a bending moment which is of contrary sense to and therefore reduces the bending moment due to the air load, but which increases the bending moment due to air load in the next adjoining panel. By thus shifting the stress from one panel to another I am able somewhat to equalize the total stresses along the spar.

Furthermore, the total stress in the spar is reduced, and not shifted merely, by making its two chords of a different sectional area at the same points in the spar length as described, the center of gravity being in all cases nearer that chord in which beam and truss action produce stresses of the same sign, since the effect of the shifting of the gravity axis thereby produced is to introduce a bending moment equal to the distance between the axis of symmetry and the gravity axis multiplied by the total axial stress on the entire spar, which eccentric bending moment is of such sign as to neutralize more or less completely the bending moment due to the original air loads and which will wholly do so at points where the eccentricity multiplied by the column load equals the bending moment as a beam. From the sectional area of each chord as determined by preliminary design, therefore, that proportion thereof which was allowed for moment stress, may be reduced to the same extent that such stress has been reduced by the eccentric moment, care being taken to so reduce each of the two chords at any given point that their relative areas remain substantially unchanged.

A further means for controlling the distribution of stresses, which is available because of the relatively low loading and the change in sign of stress in upside down flight, consists in giving to the spar such a camber at the center of its lift panels and reversed camber over the supports—a camber forming a sinusoidal curve having in an upper spar its low points at the panel centers and its high points at the supports—that it will become substantially straight when subjected to normal maximum loads. A spar thus cambered in its inner or longer panels is stronger than one which was originally straight and is deformed by the loading. By slightly exaggerating the camber over the supports, and then straightening it out by the drift trussing and by the lift trussing and its counters when the wing is assembled, the chords of the spar will be strained in the sense opposite to that in which they are strained by truss deflection under normal loading. While any desired initial stress may be thus developed, this effect may conveniently be limited to an offsetting of the chord stresses in the spar arising from its curvature due to the deflection under maximum load of the entire wing truss, which curvature will readily be found by computing from elastic considerations the deflection of the truss at each panel point, constructing the spar cambered to that degree, and in the assembly of the machine straightening the spar in one plane by means of the drift truss system and in the other plane by means of the lift truss system. This permits of more even distribution of cross-sectional area between the upper and lower chords of the spar; while the additional strain put upon the truss wires and struts will be very slight.

Referring now to the stress diagrams, in the first, Fig. 46, the full curved lines show the distribution of the separate stress due to bending moment, or pure beam action, in the several lift panels both for the upper and for the lower chord, of the upper front spar represented, which is assumed so hinged as to give it half fixed conditions at its inner end, and the upper and lower dotted lines show the direct net compressive stress due to the column action of the spar as a member of the lift and of the drift trusses, on the assumption that no deflection due to such column action occurs. Fig. 47 shows in the dotted lines the combined compressive and deflection stresses, in upper and lower chord respectively, due to column action in the attitude of normal flight, and in the full lines the summation of stresses, also in upper and lower chord respectively, due both to beam and to column action in normal flight; while, in Fig. 48, the full lines show the same summation of combined beam and column stresses under conditions of upside down flight. In Figs. 49 and 50 the upper and lower full lines show, in each of the two chords respectively, the separate stress due to the deflection of the wing truss as a whole under load, Fig. 49 showing such stress for normal flight and Fig. 50 showing it for upside down flight. Fig. 51 shows in the upper curved lines for the upper and in the lower curved lines for the lower chord the maxima of combined lift, drift, and deflection stresses both in normal and in upside down flight, while the space included between the upper and lower crenelated lines represents the untapered sectional area of the usual solid wooden spars and of the metal spars heretofore built by others. In Fig. 52 the two sets of curved lines represent, in upper and lower chord respectively, the summation of stresses due both to beam and to column action, as such stresses (see full lines of Fig. 47) are modified by a camber of the spar in its two longer panels to a degree such that at maximum load for normal flight its deflection as a beam will cause it to become straight in each of these two panels. Fig. 53 shows the separate stress produced in each chord by the eccentric shifting of the gravity axis of the spar, the full lines for normal and the dotted lines for upside down flight, and it will be noted that this stress is of contrary sign to the principal bending stresses and hence when combined therewith will tend to eliminate them. In Fig. 54 the upper and lower dotted lines show, in upper and lower chord respectively, the maxima of combined beam and column stresses both for normal and for upside down flight (Figs. 47 and 48), and the upper and lower full lines similarly show the maxima of such stresses plus the stress due to the deflection of a wing truss as a whole (see Fig. 51), as these stresses are modified by the camber of the spar in its two longer or inner panels. Fig. 55 shows in the upper and lower dotted lines a suitable distribution of the cross-sectional area of upper and lower chord respectively in order to proportion such area at different points throughout the length of the spar closely to the maxima of all the combined stresses (Figs. 53 and 54) shown in the upper and lower full lines, in a spar with eccentric gravity axis and cambered in its two longer panels. In Fig. 56, the first of the shear diagrams, the single line shows the separate shear in the web system of the spar due to the eccentricity of its gravity axis at certain points and the direct axial loading. In Fig. 57 the single line shows the variation in intensity of the separate shear due to column bending. And in Fig. 57 the dotted lines show the separate shear due to beam action, and the full lines show the combined or total shear due to both beam and column action in a cambered spar with eccentric gravity axis.

In these diagrams no secondary stresses due to the distorting effect of the truss members upon each other have been shown, for the reason, as already stated, that in a truss having the slender proportions of a wing spar such secondary stresses are too minute for practical consideration.

What I claim as new, and desire to secure by Letters Patent, is—

1. A truss for aircraft having chords of continuous closed hollow section and an integral lattice web with members which are of hollow section with rectilinear axes and at the panel points are supported substantially in the plane of their gravity axes upon the chords.

2. A truss for aircraft having chords of closed hollow section and an integral open web with members of hollow section which at the panel points form concentric joints in the plane of the gravity axes of the chords.

3. A truss for aircraft having multi-tubular chords and an integral lattice web with members of hollow section and rectilinear axes which at the panel points are supported on the chords in the plane of the gravity axes of the web members.

4. A truss for aircraft having multi-tubular chords and two spaced lattice webs which respectively connect the outer tubes of one chord to the corresponding tubes of the other chord and which have members of hollow section supported on the chords in the plane of their gravity axes.

5. A metallic aircraft truss, having definite points of support and comprising chords of closed hollow section and a connecting web, in which the chords have in the adjoining panels defined by a point of support different sectional areas proportionately to the different stresses in the two panels.

6. A metallic aircraft truss, having definite points of support and comprising chords of closed hollow section and a connecting lattice web, in which each chord is tapered intrapanel by gradual changes in its sectional areas proportioned approximately to the gradual changes in the stresses to which it is subject at different points within the panel.

7. A metallic aircraft truss, having definite points of support and comprising chords of closed hollow section and a connecting lattice web with members of hollow section, in which the successive web members within a panel have different sectional areas proportioned approximately to the different degrees of stress to which each is subject.

8. A metallic aircraft truss, comprising chords of closed hollow section and a connecting lattice web with members of hollow section, in which certain of the web members have at different points between their points of support on the chords different sectional areas proportioned approximately to the stresses thereat.

9. A metallic aircraft truss, having definite points of support and subject to combined bending and axial stresses, which comprises multi-tubular chords and an open lattice web and in which the chords have in the adjoining panels defined by a point of support different sectional areas proportioned approximately to the maxima of the combined stresses therein.

10. A metallic aircraft truss, having definite points of support and subject to combined bending and axial stresses, which comprises multi-tubular chords and a lattice web with members of hollow section and in which the chords have in and through the adjoining panels defined by a point of support a sectional area which gradually changes from point to point and at each point is proportioned approximately to the maxima of the combined stresses thereat.

11. A metallic aircraft truss, comprising upper and lower chords and a connecting lattice web, in which the web members are of open hollow section and are integrally united by taperingly-enlarged fillet ends upset to, and supporting the web members on the chords in, the plane of the gravity axes of the web members.

12. A metallic aircraft truss having upper and lower chords and a connecting lattice web which is made of sheet metal and has members of hollow section united by integral taperingly-enlarged fillet ends supporting the web members on the chords in the plane of the gravity axes of the web members.

13. A sheet metal aircraft truss, comprising upper and lower chords and integral therewith a connecting lattice web, in which the web members are shaped up to an open hollow section and are offset laterally to bring their gravity axes substantially into the plane of their supports on the chords.

14. A sheet metal aircraft truss, comprising upper and lower chords and integral therewith a connecting lattice web, in which the web members of open hollow section are supported on the chords by taperingly-enlarged fillet ends and are offset laterally to bring their gravity axes substantially into the plane of such supporting ends.

15. A metallic aircraft truss, comprising upper and lower chords and a connecting lattice web, which is shaped up from an integral sheet metal blank and in which web members of substantially V-shaped open section are supported on the chords by ends located substantially in the plane of their gravity axes.

16. A metallic aircraft truss, comprising upper and lower chords and a connecting lattice web, which is shaped up from an integral sheet metal blank and in which web members of substantially V-shaped open section are supported on the chords by taperingly-enlarged fillet ends standing substantially in the plane of their gravity axes.

17. A sheet metal aircraft truss having chords of closed hollow section and integral therewith a lattice web with members of a substantially V-section, in which the gravity axes of adjoining web members intersect at the panel points approximately in the plane of the gravity axes of the chords.

18. A sheet metal aircraft truss having chords of closed hollow section and integral therewith a lattice web with members of open hollow section, in which the web members are upset to bring their gravity axes into the plane of their supports on the chords and in the most stressed parts of the web have a V-section and outwardly flanged edges.

19. A sheet metal aircraft truss having multi-tubular chords and a plurality of spaced lattice webs each integral with and connecting corresponding tubes in the two chords.

20. A sheet metal aircraft truss having seamed tubular chords and integral therewith a lattice web with members of hollow section upset to bring their gravity axes into the plane of their supports at the chords.

21. A sheet metal aircraft truss having multi-tubular chords and integral therewith a lattice web the members of which are of open hollow section and have their gravity axes in the plane of their supports at the chords.

22. A sheet metal aircraft truss having multi-tubular chords and two lattice webs with members of hollow section, the members of each web being integral with and united by concentric joints to a tube in each chord.

23. A sheet metal aircraft truss having chords of hollow section and a connecting open web formed by members also of hollow section, one end of certain of the web members being integral with one edge of a chord and reinforced by an ear integral with the other edge of the chords.

24. A sheet metal aircraft truss having chords of closed hollow section and a connecting lattice web with members of open hollow section, the web members having widening fillet ends integral with one edge of a chord in the plane of their gravity axes.

25. A sheet metal aircraft truss having chords of closed hollow section and a connecting lattice web with members of open hollow section, the web members having taperingly widened fillet ends integral with one edge and reinforced by an ear integral with the other edge of a chord.

26. A sheet metal aircraft truss having seamed tubular chords and a connecting lattice web, the web members being of V-section and upset to bring their gravity axes into the plane of their supports at an edge of the chord tubes.

27. A sheet metal aircraft truss having seamed tubular chords and a connecting lattice web, the web members being of V-section with their gravity axes in the plane of their supports at the chords and certain of said web members having outwardly flanged edges.

28. A sheet metal aircraft truss which has multi-tubular chords and lattice webs connecting the outer tubes of one chord with the outer tubes of the other chord, the web members being of hollow section and joined to the chord tubes by fillet ends integral with one edge thereof.

29. A sheet metal aircraft truss having multi-tubular chords and a plurality of lattice webs connecting the outer tubes, the lattice webs being of open hollow section and upset to bring their gravity axes into the plane of their supports at the chords.

30. A sheet metal aircraft truss having multi-tubular chords and a plurality of connecting lattice webs, the web members being of open hollow section with fillet ends integral in the plane of their gravity axes with one edge of a chord tube.

31. A sheet metal aircraft truss having multi-tubular chords and integral therewith a plurality of connecting lattice webs, the web members being of open hollow section and forming concentric joints with the chord tubes.

32. A sheet metal aircraft truss having multi-tubular chords and integral therewith a plurality of lattice webs, the web members being of open hollow section with taperingly widened fillet ends integral with one edge of a chord tube and forming a concentric joint with said tube.

33. A metallic aircraft truss, comprising chords of hollow section and a connecting web, which along its length is tapered with respect to its points of support by variations in the thickness of the chord walls.

34. A metallic aircraft truss, comprising chords of closed hollow section and a connecting open web, which along its length has the sectional area of its chords tapered with respect to the points of support by variations in the thickness of their walls.

35. A metallic aircraft truss, comprising tubular chords and connecting lattice web, which along its length has the sectional area of its chords tapered with respect to the points of support by variations in the thickness of their walls.

36. A metallic aircraft truss, comprising tubular chords and a connecting lattice web with members of hollow section, which has the sectional area both of the chords and of the web members tapered with respect to the points of support by variations in the thickness of their walls.

37. A metallic aircraft truss, comprising multi-tubular chords and connecting lattice web or webs, which has the sectional area both of its chords and of its web members tapered with respect to the points of support by variations in the thickness of their walls.

38. A sheet metal aircraft truss, comprising chords of hollow section and integral therewith a connecting web, which is tapered with respect to the points of support by variations in the thickness of the sheet from which the truss is formed.

39. A sheet metal aircraft truss, comprising tubular chords and integral therewith a connecting lattice web, which is tapered in its sectional area by variations in the thickness of the sheet from which it is formed.

40. A sheet metal aircraft truss, comprising multi-tubular chords and integral therewith a lattice web or webs, which is tapered in sectional area by variations in the thickness of the sheet or sheets from which it is formed.

41. A sheet metal aircraft truss, comprising chords of closed hollow section and integral therewith a connecting lattice web, which is tapered from panel to panel and intra-panel by variations in the sectional area of its chords.

42. A sheet metal aircraft truss, comprising chords of closed hollow section and integral therewith a connecting lattice web, which is tapered from panel to panel and intra-panel by changes in the sectional area both of its chords and of its web members.

43. A sheet metal aircraft truss, comprising muti-tubular chords and integral therewith a lattice web or webs with members of open hollow section upset to avoid eccentric loading, which is tapered from panel to panel and intra-panel by variations in the sectional area of its chords.

44. A sheet metal aircraft truss, comprising multi-tubular chords and integral therewith a lattice web or webs with members of open hollow section upset to avoid eccentric loading, which is tapered from panel to panel and intra-panel by variations in the sectional area both of its chords and of its web members.

45. An aircraft truss, comprising upper and lower chords of closed hollow section and a connecting web, in portions of which the gravity axis of the truss is made non-parallel to its axis of symmetry by a gradual increase in the sectional area of one and a gradual decrease in the sectional area of the other of its two chords.

46. An aircraft truss, comprising upper and lower chords of closed hollow section and a connecting web, in portions of which the gravity axis of the truss is made non-parallel to its axis of symmetry by a gradual increase in the sectional area of one and a gradual decrease in the sectional area of the other of its two chords, the sectional area of each chord changing approximately in proportion to the variations in the maxima of the stresses to which it is subject.

47. A metallic aircraft truss, comprising chords of closed hollow section and a connecting web, in which one of the chords at certain points in the truss length is of greater sectional area than the other, whereby the gravity axis of the truss at such points is shifted from its axis of symmetry.

48. A metallic aircraft truss, subject to combined bending and axial stresses and comprising chords of closed hollow section and an open web, in which each chord in those portions of its length where the bending and axial stresses are of the same sign is of greater sectional area than the other and the gravity axis of the truss is gradually shifted in a curve from one side to the other of the axis of symmetry by a gradual decrease in the sectional area of one and a gradual increase in the sectional area of the other chord.

49. A sheet metal aircraft truss, subject to combined bending and axial stresses and comprising multi-tubular chords and integral therewith a plurality of lattice webs with members of open hollow section upset to avoid eccentric loading, in which the sectional areas of both chords are tapered from panel to panel and intra-panel by gradual changes in their sectional areas proportioned approximately to the gradual changes in the maxima of the combined stresses to which they are subject at different points in their length, whereby the relative sectional areas of the two chords gradually change and shift the position of the gravity axis, and each chord through those portions of the truss length where, as determined by its points of supports, it is subject to bending and axial stresses of the same sign is of greater sectional area than the other.

50. An aircraft truss comprising as an element thereof a second truss which has upper and lower chords and a connecting web and in which the panel increments of stress are applied thereto intermediate its two chords.

51. An aircraft truss comprising as an element thereof a second truss which has upper and lower chords and a connecting web and which at a point of support has one chord of greater sectional area than the other, thereby shifting its gravity axis from the axis of symmetry towards the larger chord, and at such point is provided with means for the attachment of a support between its two chords and substantially at such eccentric gravity axis.

52. A metallic aircraft truss, comprising tubular chords and an open web and having definite points of support, which at said points of support is provided with means for the attachment thereto of a group of non-parallel supports bringing their lines of action to a common point substantially at the gravity axis of the truss.

53. A metallic aircraft truss, comprising upper and lower chords and a connecting web, in which one chord is of greater sectional area than the other through a given portion of the truss length and at a point within the limits of such portion the truss is provided with means for attaching thereto non-parallel supports adapted to bring their lines of action to a common point intermediate its two chords and eccentric to the gravity axis of the truss.

54. A metallic aircraft truss, subject to combined bending and axial stresses and comprising upper and lower chords of hollow section and a connecting lattice web with members of hollow section, in which at certain points means are provided for the attachment thereto of non-parallel supports adapted to bring their lines of action to a common point between the axis of symmetry of the truss and the chord there subject to bending and axial stresses of the same sign and in which the relative sectional areas of the two chords gradually change and each chord is of greater sectional area than the other through those portions of its length, as determined by the said points at which the truss supports are to be attached, where its bending and axial stresses are of the same sign.

55. A metallic aircraft truss, having definite points of support by which it is divided into adjoining panels, which comprises upper and lower chords, a connecting web, and means for the attachment at one of said points of non-parallel supports adapted by bringing their lines of action to a point intermediate the chords and eccentric to the gravity axis of the truss to produce a bending moment of contrary sense to that due to loading in the most stressed of the adjoining panels.

56. A sheet metal aircraft truss, subject to combined bending and axial stresses and comprising chords of closed hollow section and integral therewith a lattice web with members of hollow section, which at a given point of support is provided with means for the attachment thereto of non-parallel supports adapted by bringing their lines of action to a common point eccentric to its gravity axis to produce a bending moment of contrary sense to that due to loading in the most stressed of the two adjoining panels, and in which the two chords are tapered in their sectional areas to give them at different points in their length areas proportioned approximately to the maxima of the combined modified stresses to which they are subject.

57. An aircraft truss comprising as an element thereof, and as such subject to combined bending and axial stresses, a second truss which in certain of its panels is cambered in a curve of contrary sense to the curvature produced by the bending moment due to that transverse loading which causes axial compression therein.

58. A metallic aircraft truss, subject to combined bending and axial stresses and comprising tubular chords and connecting lattice web, which in certain of its panels is cambered in a sinusoidal curve of contrary sense to the curvature produced by the bending moment due to that transverse loading causing axial compression therein and in which the chords are tapered to give each at different points in its length a sectional area proportioned approximately to the maxima of the combined stresses to which it is subject.

59. An aircraft truss, subject to combined bending and axial stresses, which at a given point of support is provided with means for the attachment thereto of non-parallel supports adapted, by bringing their lines of action to a common point eccentric to its gravity axis, to produce a bending moment of contrary sense to that due to loading in the most stressed of the two adjoining panels and which over said point is cambered in a curve of contrary sense to the curvature produced by the bending moment due to that transverse loading which causes axial compression therein.

60. A metallic aircraft truss, subject to combined bending and axial stresses and comprising chords of closed hollow section and a lattice web with members of hollow section, in which means are provided, by a camber of the truss, by the attachments for its supports, and by chords having different sectional areas at different points in their length, for modifying and to a degree equalizing the stresses due to loading in adjoining panels.

61. In a metallic aircraft truss, comprising chords and a connecting web, a lap joint connecting two parts of a given truss member of hollow section in which the cross-sectional area of the overlapping end of each part is tapered lengthwise to thereby gradually transmit the stress through the joint.

62. In a metallic aircraft truss, comprising chords of hollow section and a connecting web, a joint connecting two sections of a given truss member which in its construction embodies means, including the overlapping of the adjacent ends and the tapering of the cross-sectional area of the sections joined, adapted to absorb the bending moment at such joint.

63. In a metallic aircraft truss, comprising chords of hollow section and a connecting web, a joint connecting two sections of the truss member wherein the cross-sectional area of one section in a given length is reduced and of the other section is increased in like proportion to thereby render the cross-sectional area of the joined sections uniform throughout the joints.

64. In a metallic aircraft truss, comprising chords of hollow section and a connecting web, a joint connecting two lengths of a given truss member which provides means including the gradual tapering of the cross-sectional area of each part within the joint for varying at will the total cross-sectional area of the member within the joint from any desired minimum up to a maximum approximating the sum of the areas of the two parts joined.

65. In a metallic aircraft truss, comprising chords of hollow section and a connecting web, a lap joint connection between tapered ends of two lengths of one of its chords which at such point gives to the chord a greater sectional area than the other chord, thereby shifting the gravity axis of the truss from its axis of symmetry towards such first mentioned chord.

66. In a metallic aircraft truss, comprising upper and lower chords of hollow section and a connecting web, an anchorage for one end of the truss which includes two members united one to the end of one and the other to the end of the other chord and a tapered pin fitting into correspondingly tapered openings in the said two members.

67. In a metallic aircraft truss, comprising upper and lower chords of multi-tubular section and a connecting web, means for anchoring an end of the truss which include two eye-yokes with taperingly hollow sleeves united to the two chords respectively by telescopically joining each sleeve of a yoke to a tubular section of a chord.

68. In a metallic aircraft truss, comprising upper and lower chords of hollow section and a connecting web, an anchorage for an end of the truss which includes a stiffening member fitted snugly into each chord member and provided at one end with a rounded shoulder over which the outer end of the chord member is shaped and means for clamping the shaped outer ends of the chord members to the shoulders of the stiffening members.

69. In an aircraft truss, a joint for a metallic truss member of hollow section which comprises a plug fitted into the truss member and having a shoulder over which the upper end of the truss member is shaped and means for clamping the shaped end of the truss member to the shoulder of the plug.

70. In an aircraft truss, a joint for a metallic tubular truss member which comprises a hollow sleeve with tapered walls fitted into the truss member and having an annular shoulder over which the end of the truss member is shaped and means for clamping the shaped end of the truss member to the shoulder of the sleeve.

CHARLES WARD HALL.